(12) United States Patent
Cui

(10) Patent No.: US 12,204,427 B2
(45) Date of Patent: Jan. 21, 2025

(54) ESPI-BASED METHOD AND DEVICE FOR ENHANCING SERVER SECURITY

(71) Applicant: INSPUR SUZHOU INTELLIGENT TECHNOLOGY CO., LTD., Jiangsu (CN)

(72) Inventor: Liang Cui, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 89 days.

(21) Appl. No.: 18/249,703

(22) PCT Filed: Jul. 29, 2021

(86) PCT No.: PCT/CN2021/109175
§ 371 (c)(1),
(2) Date: Apr. 19, 2023

(87) PCT Pub. No.: WO2022/083204
PCT Pub. Date: Apr. 28, 2022

(65) Prior Publication Data
US 2023/0367684 A1 Nov. 16, 2023

(30) Foreign Application Priority Data

Oct. 19, 2020 (CN) .......................... 202011116526.8

(51) Int. Cl.
G06F 11/30 (2006.01)
G06F 13/42 (2006.01)

(52) U.S. Cl.
CPC ...... *G06F 11/3027* (2013.01); *G06F 13/4282* (2013.01)

(58) Field of Classification Search
CPC .................. G06F 11/3027; G06F 13/4282
See application file for complete search history.

(56) References Cited

U.S. PATENT DOCUMENTS

| 2010/0306434 A1* | 12/2010 | Dube ................. G06F 3/0683 710/305 |
| 2016/0118121 A1* | 4/2016 | Kelly ................. G06F 1/30 710/301 |

(Continued)

FOREIGN PATENT DOCUMENTS

| CN | 104160403 A | 11/2014 |
| CN | 107066305 A | 8/2017 |

(Continued)

OTHER PUBLICATIONS

Search report for PCT/CN2021/109175 mailed on Oct. 28, 2021.
Search report for Chinese application 202011116526.8, filed Oct. 19, 2020.

*Primary Examiner* — Henry Tsai
*Assistant Examiner* — Harry Z Wang
(74) *Attorney, Agent, or Firm* — Dennemeyer & Associates LLC

(57) ABSTRACT

An ESPI-based method and device for enhancing server security, including: S100, a Complex Programmable Logic Device (CPLD) monitors packet formats and instructions on an Enhanced Serial Peripheral Interface (ESPI) bus; S200, when the CPLD monitors an abnormal firmware Flash read/write operation, the CPLD records operation-related records in a Flash which is mounted to the CPLD; S300, the CPLD lights a Light-Emitting Diode (LED) corresponding to a system error signal line or a LED corresponding to a Baseboard Management Controller (BMC) error signal line; S400, the CPLD determines whether to take over a CS0 signal or not; S500, when the CPLD determines to take over the CS0 signal, the CPLD requests to interact with a Platform Controller Hub (PCH) and warns of a system security issue.

20 Claims, 2 Drawing Sheets

(56) References Cited

U.S. PATENT DOCUMENTS

| | | | | |
|---|---|---|---|---|
| 2019/0251010 A1* | 8/2019 | Bhutada | ............... | G06F 11/0784 |
| 2021/0349731 A1* | 11/2021 | Pillilli | ................... | G06F 9/4403 |
| 2023/0025750 A1* | 1/2023 | Teoh | ................... | G06F 11/0727 |
| 2023/0152984 A1* | 5/2023 | Moon | ................. | G06F 11/0727 |
| | | | | 711/103 |

FOREIGN PATENT DOCUMENTS

| | | | |
|---|---|---|---|
| CN | 107958166 A | | 4/2018 |
| CN | 108777639 A | | 11/2018 |
| CN | 108874700 A | | 11/2018 |
| CN | 109508279 A | | 3/2019 |
| CN | 111104673 A | | 5/2020 |
| CN | 111159090 A | | 5/2020 |
| CN | 111176952 A | | 5/2020 |
| CN | 112306795 A | | 2/2021 |

* cited by examiner

ESPI-BASED METHOD AND DEVICE FOR ENHANCING SERVER SECURITY

CROSS-REFERENCE TO RELATED APPLICATIONS

This is a 35 U.S.C. 371 National Stage Patent Application of International Application No. PCT/CN2021/109175, filed Jul. 29, 2021, which claims priority to Chinese application 202011116526.8, filed Oct. 19, 2020, each of which is hereby incorporated by reference in its entirety.

TECHNICAL FIELD

The present disclosure relates to the field of system design, in particular to an Enhanced Serial Peripheral Interface (ESPI)-based method and device for enhancing server security.

BACKGROUND

With the continuous iterative development and launch of Intel CPU (Intel refers to Intel Corporation, and CPU refers to Central Processing Unit), respective generations of CPU platform require increasingly higher speed and performance. On an Intel Purely platform and Whitely platform, a Low Pin Count Bus (LPC bus) is used between a Platform Controller Hub (PCH) and a Baseboard Management Controller (BMC); while on a newly launched Eagle Stream platform, the LPC bus is replaced by an ESPI bus.

The ESPI bus supports 4 types of channels, which are respectively a Peripheral channel, a Virtual Wire channel, an Out-of-band Message channel, and a Flash Access channel. Different channels are distinguished by different instructions and packet formats, and share one ESPI bus. The Flash Access channel enables a master and a slave on the ESPI bus to access each other's firmware Flash (i.e., Flash Memory).

The ESPI bus supports higher speed, and meanwhile, compared with the LPC bus, the ESPI bus supports reading and writing on a system firmware without the need of an additional line for reading and writing, so that the complexity of the line may be reduced. Meanwhile, the use of the ESPI bus brings about new risks, for example, if there is a security issue at either one of the BMC end and the system end, the end with the security issue may tamper with the firmware at the other end through the ESPI bus, thereby bringing about serious server security issues.

SUMMARY

Embodiments of the present disclosure provide an ESPI-based method and device for enhancing server security, which may enhance monitoring on the ESPI bus between the BMC and the PCH so that a system security risk may be warned in time, and may store logs that may be used for determining whether an issue occurs in a BMC end or in a system end.

A technical solution adopted in the embodiments of the present disclosure is an ESPI-based method for enhancing server security, which includes the following operations.

S100, a programmable logic device monitors packet formats and instructions on a serial peripheral interface bus to determine whether an abnormal firmware Flash read/write operation exists or not.

S200, when the programmable logic device determines that the abnormal firmware Flash read/write operation does not exist, a Platform Controller Hub (PCH) and a Baseboard Management Controller (BMC) communicate through the serial peripheral interface bus, and the PCH generates a first chip select signal and a second chip select signal; when the programmable logic device determines that the abnormal firmware Flash read/write operation exists, the programmable logic device records relevant operation in a Flash which is mounted to the programmable logic device.

S300, the programmable logic device judges whether an abnormal firmware is a system firmware Flash or a BMC firmware Flash according to the monitored packet formats and instructions on the serial peripheral interface bus, and lights a Light-Emitting Diode (LED) corresponding to a system error signal line or an LED corresponding to a BMC error signal line.

S400, the programmable logic device evaluates whether there is a risk in a current system according to a set security policy, and takes over the first chip select signal when there is the risk in the current system.

S500, when the first chip select signal is taken over, a system security issue is warned; and the programmable logic device warns for the BMC through an Inter-Integrated Circuit (I2C) bus.

In at least one exemplary implementation, in S100, the first chip select signal is a chip select signal of the serial peripheral interface bus in the BMC, and the BMC determines, according to the first chip select signal, whether to ignore communication information sent by the PCH; and the second chip select signal is a chip select signal of the serial peripheral interface bus in the programmable logic device, and is used for interaction of the programmable logic device with the PCH.

In at least one exemplary implementation, the operation that the BMC determines, according to the first chip select signal, whether to ignore communication information sent by the PCH includes: the BMC ignores the communication information sent by the PCH when receiving the first chip select signal; and the BMC handles (i.e., does not ignore) the communication information sent by the PCH when not receiving the first chip select signal.

In at least one exemplary implementation, to the set security policy includes: the BMC firmware Flash connected with the BMC and the system firmware Flash connected with the PCH allow only read operation, not write operation; when the write operation is needed, the BMC is required to inform the programmable logic device in advance through the I2C bus.

In at least one exemplary implementation, in S500, when the first chip select signal is taken over, the programmable logic device stops transmitting the first chip select signal, interaction between the PCH and the BMC is not able to be performed through the serial peripheral interface bus, and the programmable logic device requests to interact with the PCH.

In at least one exemplary implementation, in S500, when the programmable logic device warns for the BMC through the I2C bus, debugging equipment is connected with computer equipment through a serial port and serial port software in the computer equipment outputs a character string to read a monitoring log of the serial peripheral interface bus; or the BMC remotely inputs a character string to read the monitoring log of the serial peripheral interface bus.

An ESPI-based device for enhancing server security, including a CPU, a PCH, a BMC, a Complex Programmable Logic Device (CPLD), a system firmware Flash, a BMC firmware Flash, and a receiving device; the CPU is connected with the PCH through a PCIE bus; the PCH includes a Serial Peripheral Interface (SPI) and an ESPI channel interface; the BMC includes an SPI and an ESPI channel interface; the PCH is connected with the system firmware Flash through an SPI bus; the BMC is connected with the BMC firmware Flash through an SPI bus; the BMC is connected with the CPLD through a serial communication bus; the PCH is connected with the BMC and CPLD through an ESPI bus; the CPLD is connected with the BMC by an I2C bus; a Flash is connected with the CPLD through an SPI bus; the CPLD is connected with a system error LED indicator light and a BMC error LED indicator light respectively by respective indicator signal lines; and the CPLD is connected with the receiving device through a serial communication bus.

In at least one exemplary implementation, the ESPI bus is in a daisy chain topology; and the Flash stores a monitoring log of the ESPI bus.

In at least one exemplary implementation, the CPLD is provided with a General Purpose Input Output (GPIO) interface, the GPIO interface in the CPLD includes: a CS0 interface, a CS1 interface, a CPLD_CS0 interface, a serial communication interface, an I2C bus interface, a system error indication signal line interface, a BMC error indication signal line interface, an SPI interface, and an ESPI bus interface.

In at least one exemplary implementation, the BMC is provided with an Input Output (IO) signal interface, the IO signal interface in the BMC includes: a CPLD_CS0 interface, an I2C bus interface and an ESPI bus interface.

The technical solution provided in the embodiments of the present disclosure has the beneficial effects that the solution may enhance monitoring on the ESPI bus between the BMC and the PCH so that a system security risk may be warned in time, and may store logs that may be used for determining whether an issue occurs in a BMC end or in a system end, thereby effectively solving security risk problems brought about the ESPI bus.

DETAILED DESCRIPTION

The exemplary embodiments of the present disclosure will be described in detail below with reference to drawings, so that the advantages and features of the present disclosure are more readily understood by those having ordinary skill in the art, thereby making a clear definition of the scope of protection of the present disclosure.

Figure 1:
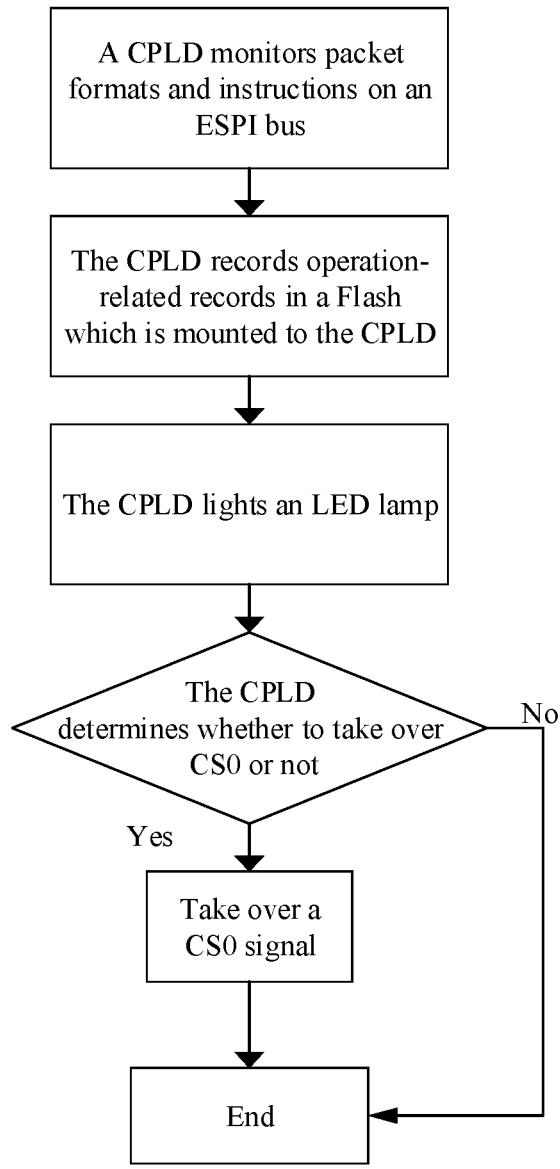
FIG. 1 is a flow diagram of an ESPI-based method for enhancing server security according to an exemplary embodiment of the present disclosure.
Figure 2:
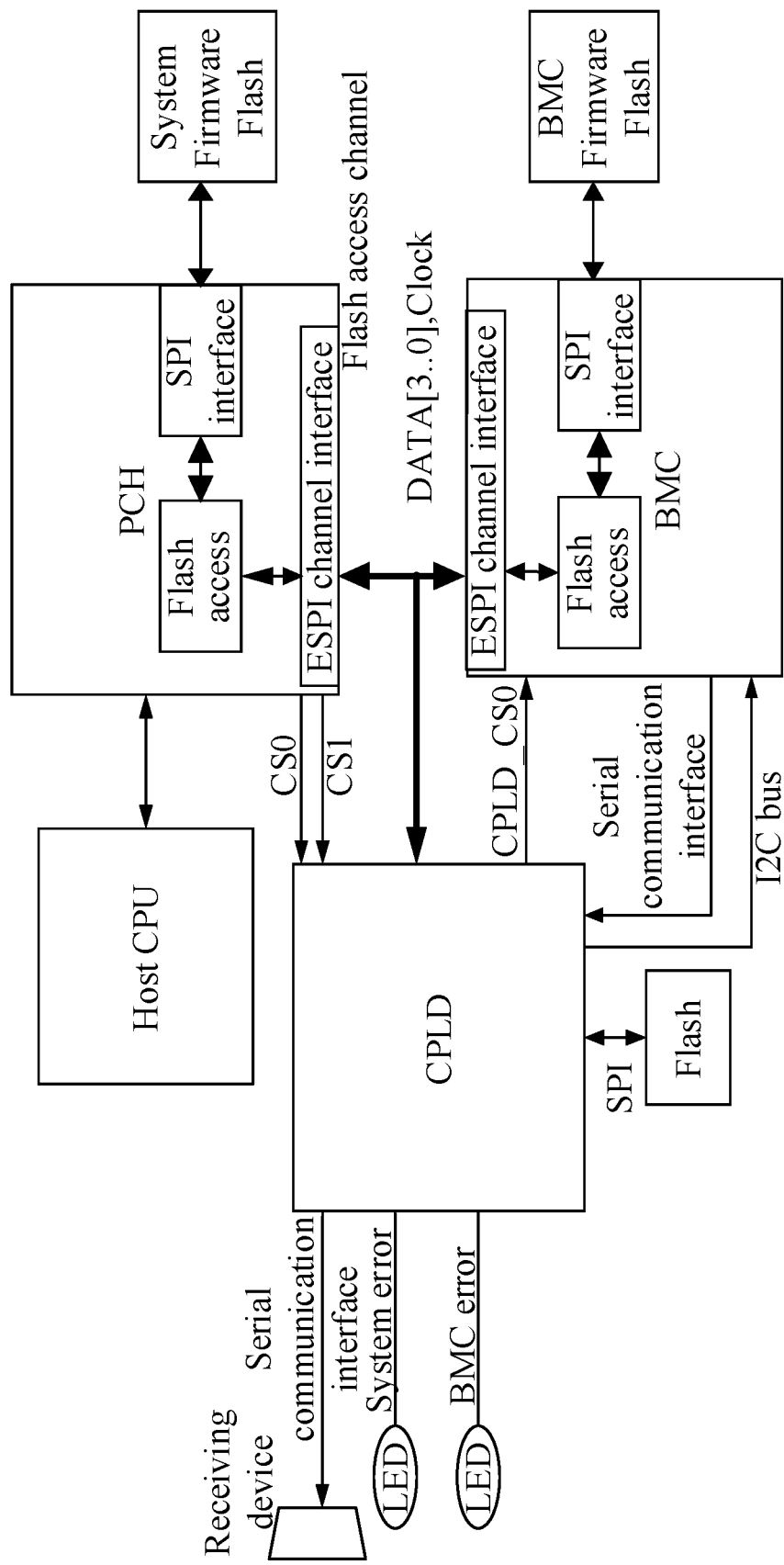
FIG. 2 is a schematic structure diagram of an ESPI-based device for enhancing server security according to the embodiments of the present disclosure.

Referring to FIG. 1 and FIG. 2, the embodiment of the present disclosure includes:
an ESPI-based method for enhancing server security, which includes the following operations.

S100, a CPLD monitors packet formats and instructions on an ESPI bus to determine whether an abnormal firmware Flash read/write operation exists or not.

S200, when the CPLD does not monitor the abnormal firmware Flash read/write operation, the PCH and the BMC normally communicate through the ESPI bus, and the PCH generates a CS0 chip select signal and a CS1 chip select signal; when the CPLD monitors the abnormal firmware Flash read/write operation, the CPLD records relevant operation in a Flash which is mounted to the CPLD, to guarantee that relevant record logs may not be lost.

S300, the CPLD judges whether a system firmware Flash or a BMC firmware Flash is abnormal, and accordingly lights an LED corresponding to a system error signal line or an LED corresponding to a BMC error signal line.

S400, the CPLD evaluates whether there is a risk in a current system according to a set security policy, and takes over the CS0 signal when there is the risk in the current system.

S500, when the CS0 signal is taken over, the CPLD_CS0 no longer transmits the CS0 signal, interaction between the PCH and the BMC is not able to be performed through the ESPI, the CPLD requests to interact with the PCH, and a system security issue is warned; meanwhile, the CPLD may also warns for the BMC through the I2C bus to notify server managers of security risk issues of the current server, a debugger may use debugging equipment to connect the equipment like a notebook through a serial port and enter a specific character string in the equipment through serial port software to read the monitoring log of the ESPI bus; likewise, the debugger may also remotely enter a specific character string through the BMC to read the monitoring log of the ESPI bus.

In S100, the CS0 chip select signal is a chip select signal of the ESPI bus in the BMC, and the BMC determines, according to the chip select signal, whether to ignore information sent by the PCH; and the CS1 chip select signal is a chip select signal of the ESPI bus in the CPLD, and is used for interaction of the CPLD with the PCH.

The operation that the BMC determines, according to the chip select signal, whether to ignore the information sent by the PCH includes: the BMC ignores the information sent by the PCH when receiving the CS0 chip select signal; and the BMC handles (i.e., does not ignore) the information sent by the PCH when not receiving the CS0 chip select signal.

In S400, the set security policy includes: the BMC firmware Flash connected with the BMC and the system firmware Flash connected with the PCH allow only read operation, not write operation. When the write operation is needed, the BMC is required to inform the CPLD in advance through the I2C bus.

The chip select signal is generated by the PCH in a division space, and the chip select signal is at a low level.

Referring to FIG. 2, based on the same inventive concept as the ESPI-based method for enhancing server security in the previous embodiment, the embodiment of the specification further provides an ESPI-based device for enhancing server security, including a CPU, a PCH, a BMC, a CPLD, a system firmware Flash, a BMC firmware Flash, a Flash and a receiving device; the CPU is connected with the PCH through a PCIE bus; the PCH includes an SPI and an ESPI channel interface; the BMC includes an SPI and an ESPI channel interface; the PCH is connected with the system firmware Flash through an SPI bus; the BMC is connected with the BMC firmware Flash through an SPI bus; the BMC is connected with the CPLD through a serial communication bus; the PCH is connected with the BMC and CPLD through an ESPI bus; the ESPI bus is in a daisy chain topology; the CPLD is connected with the BMC by an I2C bus; the Flash is connected with the CPLD through an SPI bus; the CPLD is connected with a system error LED indicator light and a BMC error LED indicator light respectively by respective indicator signal lines; and the CPLD is connected with the receiving device through a serial communication bus.

The CPLD is provided with a GPIO interface, the GPIO interface in the CPLD includes: a CS0 interface, a CS1 interface, a CPLD_CS0 interface, a serial communication interface, an I2C bus interface, a system error indication signal line interface, a BMC error indication signal line interface, an SPI interface, and an ESPI bus interface.

The BMC is provided with an IO signal interface, the IO signal interface in the BMC includes: a CPLD_CS0 interface, an I2C bus interface and an ESPI bus interface.

A daisy chain topology, in addition to having a star-based network, is the easiest way to add more computers into the network through daisy chains, or is a wiring scheme in which multiple devices are wired together in sequence or in a ring, similar to a garland of daisy flowers. If a message is aimed at the computer halfway down, each system bounces its line in the sequence until the message reaches its destination.

The daisy chain topology may form a linear topology and a ring topology.

The SPI interface is a high-speed, full-duplex, synchronous communication bus.

The ESPI bus is fully compatible with the role and function of the LPC bus, converts a System Management Bus (SMBUS) of OOB (out of band, out of band data) and GPIO of SideBand into In Band Message (in band message) which may be transmitted on the ESPI Bus, and may share the Flash with a chipset in real time.

The EPSI bus includes a clock signal and 4 data signals. The above description is only the embodiments of the present disclosure, and is not intended to limit the scope of the present disclosure. All equivalent structures or equivalent processes performed by using the contents of the specification and the drawings of the present disclosure, or directly or indirectly applied to other related technical fields, shall fall within the scope of the present disclosure.

What is claimed is:

1. An Enhanced Serial Peripheral Interface (ESPI)-based method for enhancing server security, comprising:
    S100, monitoring, by a programmable logic device, packet formats and instructions on a serial peripheral interface bus to determine whether an abnormal firmware Flash read/write operation exists or not;
    S200, when the programmable logic device determines that the abnormal firmware Flash read/write operation does not exist, communicating, by a Platform Controller Hub (PCH) and a Baseboard Management Controller (BMC), through the serial peripheral interface bus, and generating, by the PCH, a first chip select signal and a second chip select signal; when the programmable logic device determines that the abnormal firmware Flash read/write operation exists, recording, by the programmable logic device, relevant operation in a Flash which is mounted to the programmable logic device;
    S300, judging, by the programmable logic device, whether an abnormal firmware is a system firmware Flash or a BMC firmware Flash according to the monitored packet formats and instructions on the serial peripheral interface bus, and lighting, by the programmable logic device, a Light Emitting Diode (LED) corresponding to a system error signal line or an LED corresponding to a BMC error signal line;
    S400, evaluating, by the programmable logic device, whether there is a risk in a current system according to a set security policy, and taking over, by the programmable logic device, the first chip select signal when there is the risk in the current system;
    S500, when the first chip select signal is taken over, warning a system security issue; and warning, by the programmable logic device, for the BMC through an Inter-Integrated Circuit (I2C) bus.

2. The ESPI-based method for enhancing server security according to claim 1, wherein in S100, the first chip select signal is a chip select signal of the serial peripheral interface bus in the BMC, and the BMC determines, according to the first chip select signal, whether to ignore communication information sent by the PCH; and the second chip select signal is a chip select signal of the serial peripheral interface bus in the programmable logic device, and is used for interaction of the programmable logic device with the PCH.

3. The ESPI-based method for enhancing server security according to claim 2, wherein determining, by the BMC according to the first chip select signal, whether to ignore the communication information sent by the PCH comprises: ignoring, by the BMC, the communication information sent by the PCH when receiving the first chip select signal; and handling, by the BMC, the communication information sent by the PCH when not receiving the first chip select signal.

4. The ESPI-based method for enhancing server security according to claim 1, wherein the set security policy comprises: the BMC firmware Flash connected with the BMC and the system firmware Flash connected with the PCH allow only read operation, not write operation; when the write operation is needed, the BMC is required to inform the programmable logic device in advance through the I2C bus.

5. The ESPI-based method for enhancing server security according to claim 1, wherein in S500, when the first chip select signal is taken over, the programmable logic device stops transmitting the first chip select signal, interaction between the PCH and the BMC is not able to be performed through the serial peripheral interface bus, and the programmable logic device requests to interact with the PCH.

6. The ESPI-based method for enhancing server security according to claim 1, wherein in S500, when the programmable logic device warns for the BMC through the I2C bus, debugging equipment is connected with computer equipment through a serial port and serial port software in the computer equipment outputs a character string to read a monitoring log of the serial peripheral interface bus; or the BMC remotely inputs a character string to read the monitoring log of the serial peripheral interface bus.

7. An Enhanced Serial Peripheral Interface (ESPI)-based device for enhancing server security, comprising a Central Processing Unit (CPU), a Platform Controller Hub (PCH), a Baseboard Management Controller (BMC), a Complex Programmable Logic Device (CPLD), a system firmware Flash, a BMC firmware Flash and a receiving device, wherein the CPU is connected with the PCH through a Peripheral Component Interconnect Express (PCIE) bus; the PCH comprises a Serial Peripheral Interface (SPI) and an ESPI channel interface; the BMC comprises an SPI and an ESPI channel interface; the PCH is connected with the system firmware Flash through an SPI bus; the BMC is connected with the BMC firmware Flash through an SPI bus; the BMC is connected with the CPLD through a serial communication bus; the PCH is connected with the BMC and CPLD through an ESPI bus; the CPLD is connected with the BMC by an Inter-Integrated Circuit (I2C) bus; a Flash is connected with the CPLD through an SPI bus; the CPLD is respectively connected with a system error Light Emitting Diode (LED) indicator light and a BMC error LED indicator light by respective indicator signal lines; and the CPLD is connected with the receiving device through a serial communication bus.

8. The ESPI-based device for enhancing server security according to claim 7, wherein the ESPI bus is in a daisy chain topology.

9. The ESPI-based device for enhancing server security according to claim 7, wherein the CPLD is provided with a General Purpose Input Output (GPIO) interface, the GPIO interface in the CPLD comprises: a CS0 interface, a CS1 interface, a CPLD_CS0 interface, a serial communication interface, an I2C bus interface, a system error indication signal line interface, a BMC error indication signal line interface, an SPI interface, and an ESPI bus interface.

10. The ESPI-based device for enhancing server security according to claim 7, wherein the BMC is provided with an Input Output (IO) signal interface, and the IO signal interface in the BMC comprises: a CPLD_CS0 interface, an I2C bus interface and an ESPI bus interface.

11. The ESPI-based method for enhancing server security according to claim 1, wherein the programmable logic device is a Complex Programmable Logic Device (CPLD), and the serial peripheral interface bus is an ESPI bus.

12. The ESPI-based method for enhancing server security according to claim 1, wherein the first chip select signal and the second chip select signal are generated by the PCH in a division space, and are at a low level.

13. The ESPI-based method for enhancing server security according to claim 1, wherein recording, by the programmable logic device, the relevant operation in the Flash which is mounted to the programmable logic device comprises:
    recording, by the programmable logic device, the relevant operation in the Flash as a monitoring log of the serial peripheral interface bus.

14. The ESPI-based device for enhancing server security according to claim 7, wherein the Flash stores a monitoring log of the ESPI bus.

15. The ESPI-based device for enhancing server security according to claim 7, wherein
    the CPLD monitors packet formats and instructions on the ESPI bus to determine whether an abnormal firmware Flash read/write operation exists or not;
    when the CPLD determines that the abnormal firmware Flash read/write operation does not exist, the PCH and the BMC communicate through the ESPI bus, and the PCH generates a first chip select signal and a second chip select signal; when the CPLD determines that the abnormal firmware Flash read/write operation exists, the CPLD records relevant operation in the Flash which is connected with the CPLD;
    the CPLD judges whether an abnormal firmware is the system firmware Flash or the BMC firmware Flash according to the monitored packet formats and instructions on the ESPI bus, and the CPLD lights the system error LED indicator light or the BMC error LED indicator light;
    the CPLD evaluates whether there is a risk in a current system according to a set security policy, and takes over the first chip select signal when there is the risk in the current system;
    when the first chip select signal is taken over, the CPLD warns a system security issue; and warns for the BMC through the I2C bus.

16. The ESPI-based device for enhancing server security according to claim 15, wherein the first chip select signal is a chip select signal of the ESPI bus in the BMC, and the BMC determines, according to the first chip select signal, whether to ignore communication information sent by the PCH; and the second chip select signal is a chip select signal of the ESPI bus in the CPLD, and is used for interaction of the CPLD with the PCH.

17. The ESPI-based device for enhancing server security according to claim 16, wherein the BMC ignores the communication information sent by the PCH when receiving the first chip select signal, and handles the communication information sent by the PCH when not receiving the first chip select signal.

18. The ESPI-based device for enhancing server security according to claim 15, wherein the set security policy comprises: the BMC firmware Flash connected with the BMC and the system firmware Flash connected with the PCH allow only read operation, not write operation; when the write operation is needed, the BMC is required to inform the CPLD in advance through the I2C bus.

19. The ESPI-based device for enhancing server security according to claim 15, wherein when the first chip select signal is taken over, the CPLD stops transmitting the first chip select signal, interaction between the PCH and the BMC is not able to be performed through the ESPI bus, and the CPLD requests to interact with the PCH.

20. The ESPI-based device for enhancing server security according to claim 15, wherein when the CPLD warns for the BMC through the I2C bus, debugging equipment is connected with computer equipment through a serial port and serial port software in the computer equipment outputs a character string to read a monitoring log of the ESPI bus; or the BMC remotely inputs a character string to read the monitoring log of the ESPI bus.

* * * * *